(12) United States Patent
Cottron (10) Patent No.: US 11,474,229 B2
(45) Date of Patent: Oct. 18, 2022

(54) METHOD FOR OPTIMIZING THE POINTING OF AN ANTENNA OF AN AIRBORNE RADAR SYSTEM

(71) Applicant: THALES, Courbevoie (FR)

(72) Inventor: Rodolphe Cottron, Merignac (FR)

(73) Assignee: THALES, Courbevoie (FR)

( * ) Notice: Subject to any disclaimer, the term of this patent is extended or adjusted under 35 U.S.C. 154(b) by 382 days.

(21) Appl. No.: 16/673,802

(22) Filed: Nov. 4, 2019

(65) Prior Publication Data
US 2020/0150259 A1    May 14, 2020

(30) Foreign Application Priority Data

Nov. 8, 2018  (FR) ...................................... 1871451

(51) Int. Cl.
*G01S 13/42*      (2006.01)
*G01S 7/40*       (2006.01)
(Continued)

(52) U.S. Cl.
CPC .......... *G01S 13/426* (2013.01); *G01S 7/4026* (2013.01); *H01Q 3/04* (2013.01); *G01S 2013/0272* (2013.01)

(58) Field of Classification Search
CPC .. G01S 13/426; G01S 7/4026; G01S 13/0272; G01S 13/726; H01Q 3/04
(Continued)

(56) References Cited

U.S. PATENT DOCUMENTS 5,488,381 A * 1/1996 Bardy ................... G01S 13/426
                                                    342/372
6,011,505 A * 1/2000 Poehler ............... G01S 13/9019
                                                    342/25 C
(Continued)

FOREIGN PATENT DOCUMENTS

CA       2651460 A1 * 11/2007 ............. G01S 13/87
EP       0716318 B1 *  6/2002 ......... G01S 13/9092
(Continued)

*Primary Examiner* — Vladimir Magloire
*Assistant Examiner* — Alexander L. Syrkin
(74) *Attorney, Agent, or Firm* — BakerHostetler (57) ABSTRACT

A method for optimizing the elevational pointing of an antenna of an airborne radar system at an altitude h includes an antenna and processing and calculation means, the method comprising: a. selecting an area of interest b. calculating atmospheric losses $L_{ref}$ at a reference altitude $h_{ref}$ at the reference range $D_{ref}$ and calculating a reference criterion $K_{ref}=-40\log_{10}(D_{ref})$; c. for each possible elevational pointing distance of the antenna $D_{pt}$ from the area of interest, calculating the antenna elevation S that makes it possible to target the distance $D_{pt}$ via the centre of the antenna; d. for each distance D from the region of interest, calculating the angle θ at which the antenna observes the point of the ground at the distance D and calculating a criterion; 1. $K(D)=G_e(\theta)+G_r(\theta)-40\log_{10}D+L_{ref}(h_{ref},D_{ref})-L_{atmo}(h,D)$ 2. where $G_e(\theta),G_r(\theta)$ are respectively the gains of the antenna that are normalized at emission and at reception; e. calculating all of the distances D that, for this pointing distance $D_{pt}$, satisfy the relationship $K(D)>K_{ref}$ so as to obtain the start and the end of the sub-swath actually able to be used by the radar system; and calculating the actually usable sub-swaths that are to be juxtaposed (A, B, C) in order to cover the whole of the area of interest without discontinuities.

8 Claims, 5 Drawing Sheets

(51) Int. Cl.
*H01Q 3/04* (2006.01)
*G01S 13/02* (2006.01)

(58) Field of Classification Search
USPC .......................................................... 342/148
See application file for complete search history.

(56) References Cited

U.S. PATENT DOCUMENTS

| | | |
|---|---|---|
| 6,841,083 B2 | 1/2005 | Scalzo et al. |
| 7,889,129 B2 * | 2/2011 | Fox ........................ H01Q 1/288 342/376 |
| 8,717,226 B2 * | 5/2014 | Bon ........................ G01S 7/4026 342/75 |
| 2009/0284406 A1 * | 11/2009 | Comic ................. G01S 13/4418 342/33 |
| 2011/0241931 A1 * | 10/2011 | Krich .................... G01S 7/2813 342/159 |

FOREIGN PATENT DOCUMENTS

| | | | |
|---|---|---|---|
| FR | 2 900 736 A1 | 11/2007 | |
| FR | 2900736 A1 * | 11/2007 | ............. G01S 13/87 |
| FR | 3 027 408 A1 | 4/2016 | |
| FR | 3027408 A1 * | 4/2016 | ........... G01S 13/426 |
| JP | 10268045 A * | 10/1998 | ............. G01S 13/90 |
| WO | WO-9222830 A1 * | 12/1992 | ........... G01S 13/953 |

\* cited by examiner

METHOD FOR OPTIMIZING THE POINTING OF AN ANTENNA OF AN AIRBORNE RADAR SYSTEM

CROSS-REFERENCE TO RELATED APPLICATIONS

This application claims priority to foreign French patent application No. FR 1871451, filed on Nov. 8, 2018, the disclosure of which is incorporated by reference in its entirety.

FIELD OF THE INVENTION

The invention relates to the field of airborne radars for monitoring land or sea, and more particularly of airborne radars at altitudes of several tens of thousands of feet.

BACKGROUND

In operational applications, for various reasons (discretion, protection distance, electromagnetic horizon, use of MALE or HALE drones or even balloons, etc.), monitoring is being carried out at increasingly high altitudes. Operational altitudes, which generally used to be lower than 10000 feet, may thus now reach several tens of thousands of feet.

Unfortunately, the swath decreases with the altitude of the radar (and therefore with the antenna elevation), meaning that the monitored ground area also decreases. Whereas, at low altitude, the swath naturally covers virtually all of the ground as far as the radar horizon, at high altitude, it is necessary to use several antenna pointing operations in order to cover the whole of the area of interest.

The difficulty then lies in correctly positioning each of these pointing operations. Specifically, it is necessary to obtain continuous coverage of the area of interest (that is to say without a detection gap between the various pointing operations) while at the same time limiting the overlap between these pointing operations so as not to needlessly multiply the number of pointing operations.

Figure 1:
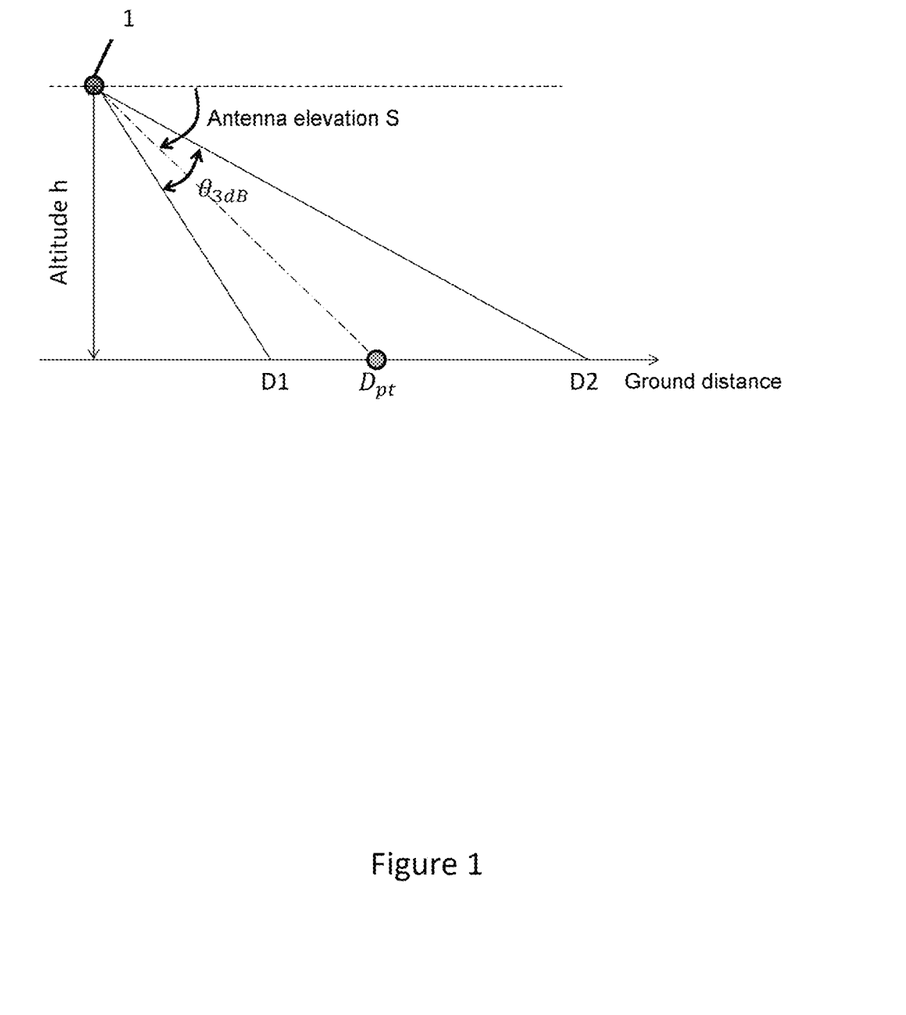
FIG. 1 shows a geometrical configuration of an airborne monitoring system.

FIG. 1 describes the geometrical configuration of an airborne monitoring system in which the radar system 1 is situated at an altitude h with respect to the ground. The radar antenna, the elevational angular aperture of which has the value $\theta_{3dB}$, targets, at the centre thereof, a point on the ground situated at a distance $D_{pt}$. The geometrical footprint of the antenna on the ground defines an area [D1, D2] called swath. The most direct approach for optimizing the antenna pointing operations consists in using the aperture $\theta_{3dB}$ of the antenna to calculate various values of D1 and D2 such that the juxtaposition of the various sub-swaths [D1, D2] covers the area of interest to be covered.

Unfortunately, this purely geometrical approach does not suffice in the applications that are contemplated. At a great distance, for example, this approach does not take into account the limit of the range of the radar, and the swath estimated by the above method would be greater than the actually usable swath. By contrast, at a short distance, the geometrical criterion uses a beam aperture width at 3 dB, whereas an aperture at 10 dB could perhaps be suitable, thereby in this case underestimating the swath width. Overall, the estimation of the actually usable swath would be falsified, and it would not make it possible to ensure continuity of the detection between the sub-swaths.

The prior art discloses performing a plurality of pointing operations in order to cover the whole of the area of interest. Document USH126H for example discloses a method for calculating the pointing operations of the various beam centres that uses the beam width, which amounts to using the geometrical method from FIG. 1 and which does not allow continuity between the various pointing operations. In document FR3027408, the calculation of the position of the various swaths is not explained, and it is indicated that the sub-swaths are not contiguous, thereby not making it possible to ensure continuity of the detection.

The invention aims to mitigate the abovementioned problem, that is to say optimize the pointing of an antenna in order to best cover a surface of interest, without a discontinuity in the detection capability, and while also taking into account the sought target type. To this end, one subject of the invention is a method as described by the claims.

Another subject of the invention is a system implementing this method.

SUMMARY OF THE INVENTION

One subject of the invention is thus a method for optimizing the elevational pointing of an antenna of an airborne radar system at an altitude h comprising an antenna and processing and calculation means, the method comprising:
a. selecting an area of interest
b. calculating atmospheric losses $L_{ref}$ at a reference altitude $h_{ref}$ at the reference range $D_{ref}$ and calculating a reference criterion $K_{ref}=-40 \log_{10}(D_{ref})$;
c. for each possible elevational pointing distance of the antenna $D_{pt}$ from the area of interest, calculating the antenna elevation S that makes it possible to target the distance $D_{pt}$ via the centre of the antenna;
d. for each distance D from the region of interest, calculating the angle θ at which the antenna observes the point of the ground at the distance D and calculating a criterion;

$$K(D)=G_e(\theta)+G_r(\theta)-40 \log_{10} D+L_{ref}(h_{ref},D_{ref})-L_{atmo}(h,D)$$

where $G_e(\theta)$, $G_r(\theta)$ are respectively the gains of the antenna that are normalized at emission and at reception;
e. calculating all of the distances D that, for this pointing distance $D_{pt}$, satisfy the relationship $K(D)>K_{ref}$ so as to obtain the start and the end of the sub-swath actually able to be used by the radar system; and
f. calculating the actually usable sub-swaths that are to be juxtaposed in order to cover the whole of the area of interest without discontinuities.

According to particular embodiments of such a method:
steps b) to f) are repeated with various radar equivalent surface values $SER_{ref}$, having recalculated the new ranges $D_{ref}$ corresponding to these new $SER_{ref}$ beforehand.
steps b) to f) are repeated with various radar waveforms.
steps b) to f) are repeated for various emission and reception patterns of the antenna.

Another subject of the invention is an airborne radar system at an altitude h for implementing a method for optimizing the pointing of an azimuthal and elevational scanning antenna of said radar system, said radar system being characterized in that it comprises processing means configured so as to calculate a reference range $D_{ref}$ for a given radar equivalent surface $SER_{ref}$, calculate atmospheric losses $L_{ref}$ at a reference altitude $h_{ref}$ at the distance $D_{ref}$ and calculate a reference criterion $K_{ref}=-40 \log_{10}(D_{ref})$ and then, for each possible pointing distance of the antenna $D_{pt}$ from the area of interest, calculate the antenna elevation S that makes it possible to target the distance $D_{pt}$ via the centre of the antenna and then, for each distance D from the region of interest, calculate the angle θ at which the antenna observes the point of the ground at the distance D and to calculate a criterion $$K(D)=G_e(\theta)+G_r(\theta)-40\log_{10}D+L_{ref}(h_{ref},D_{ref})-L_{atmo}(h,D)$$

where $G_e(\theta)$, $G_r(\theta)$ are respectively the gains of the antenna that are normalized at emission and at reception, and then calculate all of the distances D that, for this pointing distance $D_{pt}$, satisfy the relationship $K(D) > K_{ref}$ so as to obtain the start and the end of the sub-swath actually able to be used by the radar system, and lastly repeat these calculation steps for all of the pointing distances $D_{pt}$ from the area of interest, and then calculate the actually usable sub-swaths that are to be juxtaposed in order to cover the whole of the area of interest without discontinuities, with minimum overlap and with a minimum number of elevational antenna pointing operations.

According to particular embodiments of such a system:
the radar waveforms emitted by the antenna are able to be configured.
the emission and reception patterns are able to be configured.

BRIEF DESCRIPTION OF THE DRAWINGS

Other features, details and advantages of the invention will become apparent upon reading the description provided with reference to the appended drawings, which are given by way of example and in which, respectively:

FIGS. 4A and 4B show the results of an algorithm for calculating usable sub-swaths at reception of the invention for two different target types.

The references to the figures, when they are identical, correspond to the same elements.

The elements in the figures are not to scale unless indicated otherwise.

DETAILED DESCRIPTION OF THE INVENTION

One subject of the invention is a method for optimizing elevational antenna pointing operations in order to harness:
the position of the actually usable sub-swaths in terms of detection,
and the continuity of the detection between the sub-swaths,
and a system implementing this method.

Figure 2:
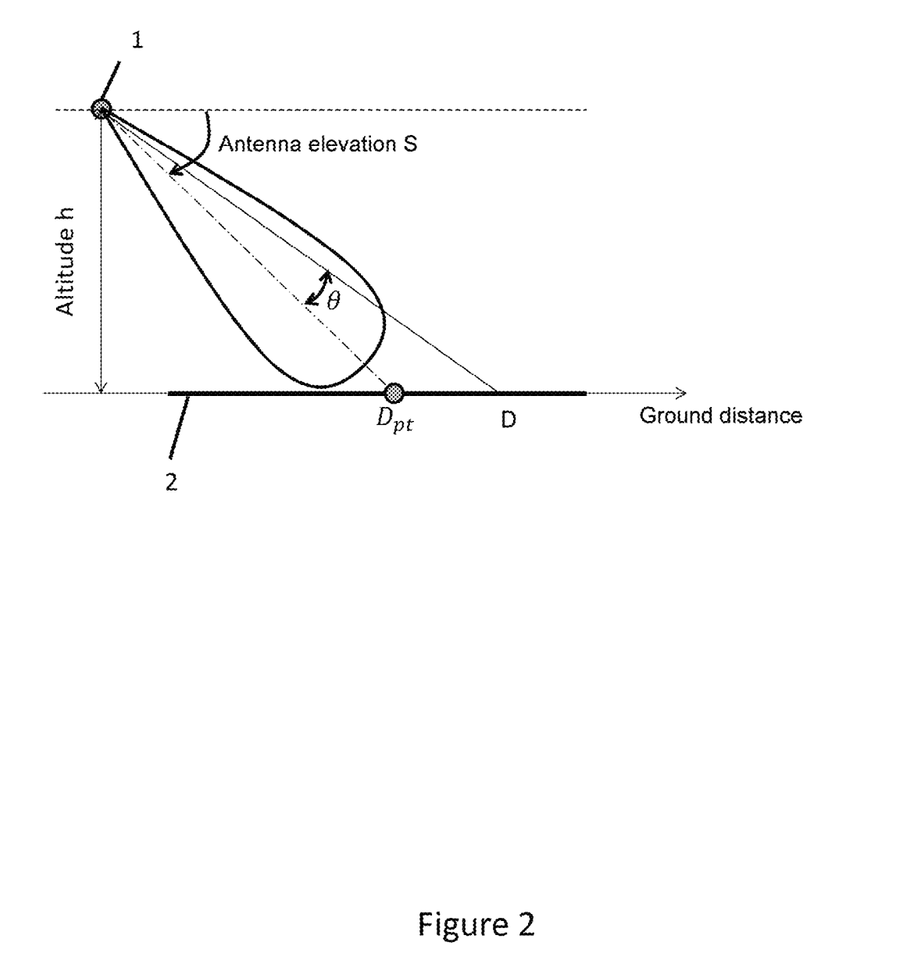
FIG. 2 shows the geometry and the various variables used by a method for optimizing the pointing of an antenna of the invention.

FIG. 2 illustrates the geometrical aspect of the invention and the parameters that are used in an optimization method of the invention. In this embodiment, a radar system 1 is airborne at an altitude h. This system may be carried by an aeroplane, a helicopter, an aircraft or any other type of air carrier. This radar system comprises an azimuthal and elevational scanning antenna and processing means. In the embodiment of FIG. 2, the azimuthal scanning is mechanical over 360° and the elevational scanning is mechanical. In another embodiment, the azimuthal scanning is less than 360° and the elevational scanning may involve electronic de-pointing.

To determine the minimum number of elevational pointing operations to be performed in order to cover a given area of interest while at the same time ensuring continuity of the detection capability, 3 simple radar parameters known to those skilled in the art are used:

the reference range, $D_{ref}$, for a given target of SER=$SER_{ref}$. This reference range corresponds to a fixed detection probability $P_d$ and false alarm rate and when the target is seen by the maximum gain of the antenna;

the reference altitude $alt_{ref}$ at which this reference range is obtained and which makes it possible to calculate atmospheric losses $L_{ref}$ at the distance $D_{ref}$; and the expression of the patterns of the elevational antenna at emission and at reception, normalized to 0 dB for the maximum gain. The normalized antenna gains at emission and at reception are respectively denoted Ge(θ) and Ge(θ).

Using the radar equation, it is then possible to write:

$$\frac{S}{B} = \frac{Pc \cdot Ge_{max} \cdot Gr_{max} \cdot Ge(\theta) \cdot Gr(\theta) \cdot \lambda^2 \cdot SER \cdot G_{trt}}{((4\pi)^3 \cdot D^4 \cdot L \cdot kTBF \cdot L_{atmo})} = A \cdot \frac{Ge(\theta) \cdot Gr(\theta)}{(D^4 \cdot L_{atmo})}$$

where:
Pc is the peak power of the radar,
$Ge_{max}$ is the maximum gain of the antenna at emission,
$Gr_{max}$ is the maximum gain of the antenna at reception,
λ is the wavelength of the radar,
SER is the RES of the radar,
$G_{trt}$ is the overall gain of the radar processing,
D is the radial distance of the radar echo,
L are all of the losses apart from atmospheric losses,
k is the Boltzmann constant,
T is the temperature of the radar,
B is the reception band of the radar,
F is the noise factor of the radar,
A is a constant that combines a large number of the above parameters and the numerical values of which do not need to be known, as will be seen further on,
$L_{atmo}$ are atmospheric losses.

In general, atmospheric losses depend on the altitude at which the radar system 1 is airborne, on the altitude of the target and on the radar-target distance. However, in the embodiment of FIG. 2, it is considered that the altitude of the target is negligible, and it is therefore the case that: $L_{atmo}=L_{atmo}(h, D)$.

As defined above, the sensitivity of the mode makes it possible to detect a target SER=$SER_{ref}$ seen by the maximum gain of the antenna at a distance $D_{ref}$, therefore:

$$\left(\frac{S}{B}\right)_{ref} = A \cdot \frac{1}{D_{ref}^4 \cdot Lref}$$

To overcome internal parameters of the radar, it is then possible to define the reference constant:

$$K_{ref} = \frac{1}{D_{ref}^4}$$

Thus, for any D and θ, it is possible to calculate:

$$K = \frac{Ge(\theta).Gr(\theta)}{D^4} \cdot \frac{L_{ref}}{L_{atmo}}$$

If $K > K_{ref}$, then the target is detected for the pair (D,θ).

By virtue of this criterion, it is possible to calculate, for each distance from the ground targeted by the centre of the antenna $D_{pointing}$ (and the corresponding antenna elevations), the start and the end of the actually usable swath. By performing this calculation over the entire region of interest, it is therefore possible to calculate the minimum number of antenna pointing operations for covering the whole of the region of interest without discontinuities and with minimum overlap.

Figure 3A:
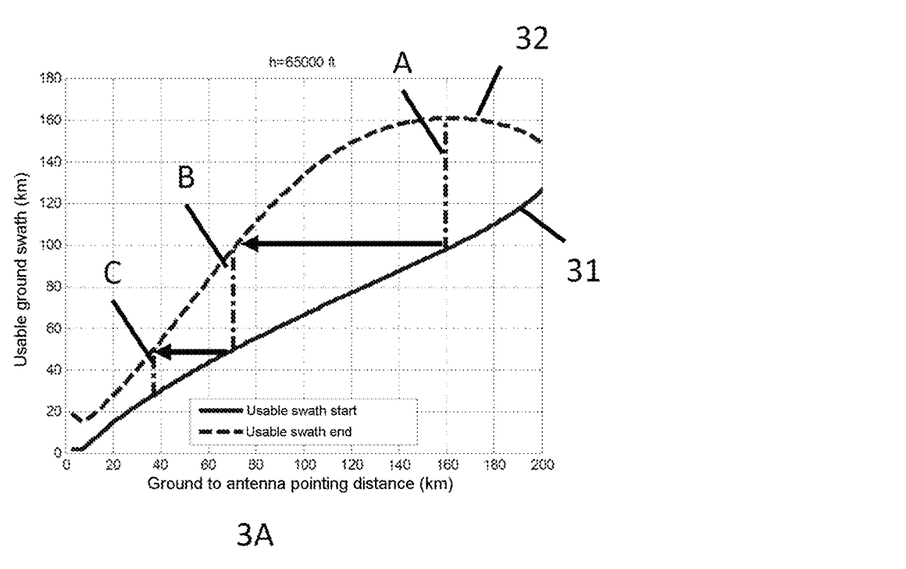
FIGS. 3A and 3B show the results of an algorithm for calculating usable sub-swaths at reception of the invention for two different altitudes.
Figure 3B:
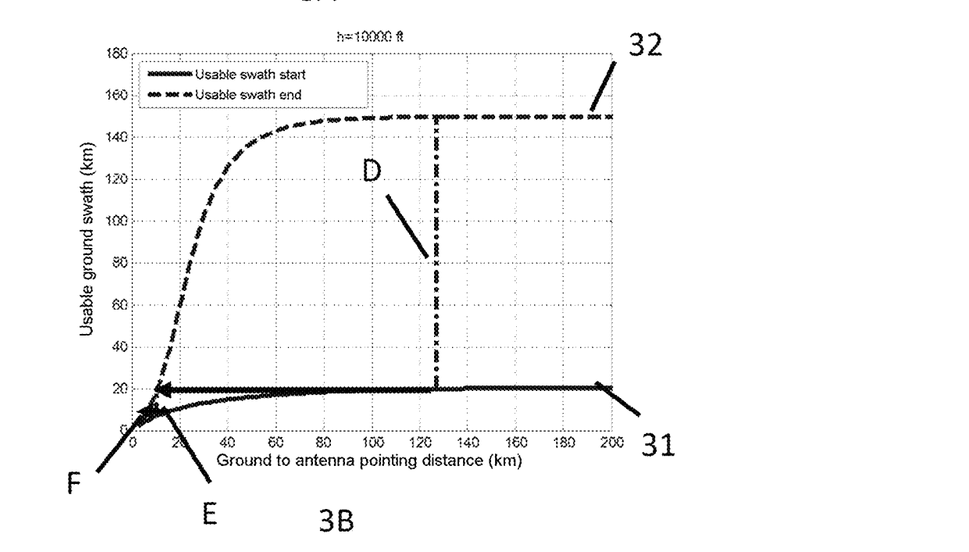

Therefore, according to one embodiment of the invention, the method for optimizing the pointing of the antenna of the radar system 1 in order to study a region of interest 2 uses an algorithm the variables of which are shown in FIG. 2 and the pseudocode of which is described below, using the following steps:

1. Let h be the altitude at which the radar system 1 is airborne;
2. Calculate atmospheric losses $L_{ref}$ at a reference altitude $h_{ref}$ at the reference range $D_{ref}$.
3. Calculate the reference constant $K_{ref} = -40 * \log_{10}(D_{ref})$;
4. For each possible pointing distance of the antenna, $D_{pt}$;
   a. Calculate the antenna elevation, S, for targeting the pointing distance via the centre of the antenna;
   b. For each distance D from the region of interest 2;
      i. Calculate the angle θ at which the antenna sees the point of the ground at the distance D;
      ii. Calculate the criterion $K = Ge(\theta) + Gr(\theta) - 40 \log_{10}(D) + L_{ref}(alt_{ref}, D_{ref}) - L_{atmo}(h, D)$ (all of the terms being expressed in dB);
   c. End
   d. Calculate the start and the end of the actually usable swath for this value of $D_{pt}$, that is to say all of the distances D that, for this value of $D_{pt}$, satisfy: $K(D) > K_{ref}$
5. End Using this algorithm, it is therefore possible to calculate the actually usable swaths as a function of the ground to antenna pointing distance. This calculation is performed by the processing means of the radar system. FIGS. 3A and 3B shows the curves obtained using the algorithm for one and the same radar mode and with the following parameters: $D_{ref}=150$ km, $alt_{ref}=10$ kft and $SER_{ref}=100$ m² for two altitudes 10 kft (3B) and 65 kft (3A) respectively. In two graphs 3A and 3B, the curves 31 represent the minimum distance of the swath able to be used by the radar system 1 for each pointing distance $D_{pt}$ scenario. The curves 32 represent the maximum usable distance of the swath for each pointing distance $D_{pt}$ scenario.

It is possible to optimize the antenna pointing by virtue of these curves. This optimization may be performed using three different methods.

In the embodiment of FIGS. 3A and 3B, the optimization is performed in "maximum range" mode. This means that the antenna pointing is optimized based on a first pointing operation giving the maximum range of the radar system. This mode of operation makes it possible for example to avoid detection, to comply with protection distances or else to minimize interference. To make the radar system 1 work with maximum range, the pointing distance that gives the largest usable swath end is sought in FIGS. 3A and 3B. The swath start and the associated antenna elevation angle for pointing the antenna are then deduced therefrom. The vertical segments A and D in FIGS. 3A and 3B each respectively represent the first sub-swath of the pointing operation giving the largest usable swath end. To define the following pointing operation, the pointing distance whose usable swath end is equal to the usable swath start of the first pointing operation is then sought. This also makes it possible to ascertain the swath start and the elevation angle of this new pointing operation. The vertical segments B and E for FIGS. 3A and 3B respectively each represent the sub-swath of this second pointing operation giving a usable sub-swath that is juxtaposed with the first sub-swath. The arrows linking segments A and B and D and E respectively illustrate how to move from the start of the usable sub-swath of the first pointing operation to the end of the sub-swath of the second pointing operation (and likewise to move from the second to the third).

Proceeding iteratively, it is then possible to determine the minimum number of antenna pointing operations (and the associated antenna elevations) to continuously cover a given area of interest and with minimum overlap between the sub-swaths, or to determine the minimum distance covered by the pointing operation when limited to a given number of pointing operations. In FIGS. 3A and 3B, the vertical segments A, B, C and D, E, F respectively represent the sub-swaths corresponding to this mode of operation in which the number of pointing operations is limited to three. In FIG. 3B, at an altitude h=10 kft, it is observed that a single pointing operation $D_{pt}=125$ km corresponding to a usable sub-swath of 130 km (segment D) makes it possible on its own to cover virtually all of the area of interest corresponding to D+E+F, the other two pointing operations affording limited benefit, the two sub-swaths E and F being of negligible lengths. By contrast, in FIG. 3B, at an altitude h=65000 ft, the three pointing operations at $D_{pt}=38$ km, 72 km and 160 km are necessary in order to cover the area of interest, none of the three corresponding sub-swaths (respectively A, B, C) being of negligible length. Sub-swaths A, B and B, C (respectively D, E and E, F) are called adjacent sub-swaths.

In another embodiment, the optimization is performed in "minimum distance" mode. In this case, the optimization is performed such that the first antenna pointing operation gives a minimum covered distance desired by the user, for example in order to perform escort missions. In this embodiment, based on the graph of the actually usable swaths as a function of the antenna pointing operation, the pointing distance that gives the usable sub-swath start at the desired minimum distance is sought. The usable sub-swath end for this antenna pointing operation is deduced therefrom, thereby making it possible to determine the start of the next sub-swath using the same method as explained above by repeating these steps until covering the desired area of interest or until reaching the fixed limit of the number of antenna pointing operations.

In another embodiment, the optimization is performed in "search area" mode. In this embodiment, it is not the maximum range or the minimum covered distance that is sought, but the coverage of a fixed area of interest that corresponds to a maximum distance and a minimum distance. In this embodiment, antenna pointing operations for covering the area of interest are determined similarly to the case in which the range is at a maximum, except that the process is begun by searching for the pointing distance giving the usable swath end at the maximum distance rather than searching for the pointing distance giving the largest usable swath end. The process is stopped when the pointing distance that gives the sub-swath start equal to the minimum distance from the fixed area of interest is obtained. As an alternative, the area of interest may be covered as in the case in which it is desired to give preference to the minimum covered distance by replacing the desired minimum distance with the minimum distance.

By virtue of using the algorithm for calculating the actually usable sub-swaths as a function of all of the possible pointing distances and by virtue of one of the modes for optimizing antenna pointing, it is possible to harness the position of the sub-swaths actually able to be used by the radar system in terms of detection, while at the same time ensuring detection continuity between the sub-swaths with minimum overlap. Minimum overlap is understood to mean that the distance between the start of a sub-swath (respectively the end of a sub-swath) of a pointing operation and the end of an adjacent sub-swath (respectively the start of an adjacent sub-swath) is less than a few kilometres.

The region of interest to be monitored by the radar system may be modified dynamically by a user. Therefore, the choice of the optimized pointing operations is adapted in real time so as to cover the area of interest selected dynamically by a user without discontinuity and with minimum overlap.

In one embodiment of the invention, the actually usable sub-swaths, as a function of all of the possible pointing distances, are calculated dynamically and automatically as a function of the altitude of the carrier of the radar system by the processing means. The choice of the optimized pointing operations for a fixed area of interest, which is determined from the curves of the sub-swaths, is therefore adjusted automatically as a function of the altitude.

In some cases, notably in maritime searching, several types of target are likely to be beneficial to be sought using the radar system. It may prove that these targets have a SER different from the $SER_{ref}$ used for the previous optimization. If the other targets have a $SER_{ref2}$ less than $SER_{ref}$, the choice of the previously performed pointing operations is no longer optimum keeping the same pointing distances, as detection continuity in the area of interest is no longer guaranteed. By contrast, if the other targets have a $SER_{ref2}$ greater than $SER_{ref}$, the entire range capability of the radar is not used. In order to take the various target types into account, it is enough to recalculate the reference range $D_{ref2}$ of the radar and atmospheric losses $L_{ref2}$ through an iterative calculation based on the radar equation with $SER=SER_{ref2}$, and then to use these values in the algorithm for calculating the new usable sub-swaths at reception.

FIGS. 4A and 4B show the results of the algorithm for calculating usable sub-swaths at reception of the invention for two different target types and with one and the same radar mode. FIG. 4A is obtained with the same parameters as FIG. 3A: the reference range $D_{ref}$=150 km is obtained for targets $SER_{ref}$=100 m² at a reference altitude $alt_{ref}$=65 kft. The curves of FIG. 4B are obtained by virtue of the algorithm by calculating $D_{ref2}$ and $L_{ref2}$ for targets of $SER_{ref2}$=500 m². In FIG. 4B, the swath end and start curves calculated for one and the same radar mode but for targets of SER different from those of 4A give rise to a new optimization of the antenna pointing operations.

Thus, in one embodiment, the choice of the pointing operations is adapted depending on the type of targets that are sought and on the associated SER, a value that the operator is able to adjust dynamically.

The radar system 1 of FIG. 2 has mechanical azimuthal scanning. However, in another embodiment, the radar system has electronic azimuthal scanning. In this case, it is enough, in the algorithm, to take into account the decrease in gain of the antenna as a function of the electronic pointing directions of the antenna and the expansion of the elevational beam $\theta_{3\ dB}$.

In order to give preference to detection at short, intermediate or long distances, it may be desirable to use different radar waveforms and/or antenna patterns. However, as the reference range is different for each antenna pattern and each waveform, the actually usable sub-swaths determined by the algorithm are themselves also different. Therefore, in one embodiment of the invention, the choice of the pointing operations is adapted depending on the radar waveform and/or on the antenna pattern, parameters that are selected dynamically by the user, or automatically by the radar depending on the search area or on the RES chosen by the operator.

Figure 5:
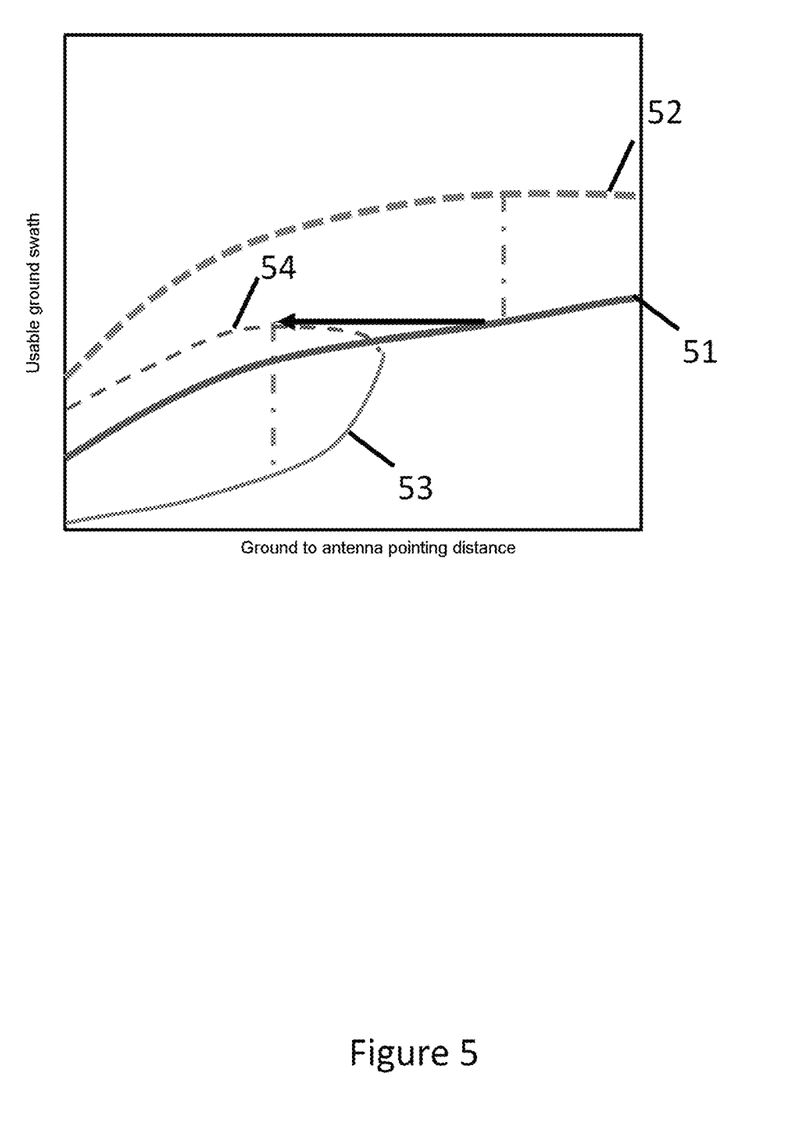
FIG. 5 shows the result of an optimization method of the invention using a plurality of waveforms.

FIG. 5 illustrates one example of optimizing antenna pointing using two waveforms. With the algorithm and using the same parameters ($D_{ref}$, $L_{ref}$, $alt_{ref}$, $SER_{ref}$ and h), the usable swath starts and ends are calculated for each of two waveforms (F01 and F02). The usable sub-swath end curves 52 and 54 and the usable sub-swath start curves 51 and 53 are then obtained, respectively, for the waveform F01 and F02. Depending on the desired optimization mode (maximum range, minimum covered distance, search area), the antenna pointing is optimized in the same way as explained above but, to move from one pointing distance to the other, rather than remaining on the same sub-swath curve, that of the other waveform is used.

Thus, in the embodiment of FIG. 5, operation is in maximum range mode, the first pointing distance giving the maximum usable swath end is produced with the waveform F01. Now, the second pointing distance nearest to the first pointing distance and whose usable swath end is equal to the usable swath start of the first pointing operation is obtained with F02 and not F01. There will therefore be a change from one waveform to the other in order to perform optimum antenna pointing.

The invention claimed is:
1. A method for optimizing the elevational pointing of an antenna of an airborne radar system at an altitude h comprising an antenna and processing and calculation means, the method comprising:
   a. selecting an area of interest;
   b. calculating atmospheric losses $L_{ref}$ at a reference altitude $h_{ref}$ at the reference range $D_{ref}$ and calculating a reference criterion $K_{ref}$=−40 $\log_{10}$ ($D_{ref}$);
   c. for each possible elevational pointing distance of the antenna $D_{pt}$ from the area of interest, calculating the antenna elevation S that makes it possible to target the distance $D_{pt}$ via the center of the antenna;
   d. for each distance D from the region of interest, calculating the angle θ at which the antenna observes the point of the ground at the distance D and calculating a criterion;

$$K(D)=G_e(\theta)+G_r(\theta)-40 \log_{10} D+L_{ref}(h_{ref},D_{ref})-L_{atmo}(h,D)$$

where $G_e(\theta)$, $G_r(\theta)$ are respectively the gains of the antenna that are normalized at emission and at reception;

e. calculating all of the distances D that, for this pointing distance $D_{pt}$, satisfy the relationship $K(D) > K_{ref}$ so as to obtain the start and the end of the sub-swath actually able to be used by the radar system;

f. calculating the actually usable sub-swaths that are to be juxtaposed (A, B, C) in order to cover the whole of the area of interest without discontinuities; and g. pointing said antenna to said actually usable sub-swaths.

2. The method of claim 1, wherein steps b) to f) are repeated with various radar equivalent surface values $SER_{ref}$, having recalculated the new ranges $D_{ref}$ corresponding to these new $SER_{ref}$ beforehand.

3. The method of claim 1, wherein steps b) to f) are repeated with various radar waveforms.

4. The method of claim 1, wherein steps b) to f) are repeated for various emission and reception patterns of the antenna.

5. The method of claim 1, wherein steps a) to f) are repeated for various altitudes h of the airborne radar system.

6. An airborne radar system at an altitude h for implementing a method for optimizing the pointing of an azimuthal and elevational scanning antenna of said radar system, said radar system being characterized in that it comprises processing means configured so as to calculate a reference range $D_{ref}$ for a given radar equivalent surface $SER_{ref}$, calculate atmospheric losses $L_{ref}$ at a reference altitude $h_{ref}$ at the distance $D_{ref}$ and calculate a reference criterion $K_{ref} = -40 \log_{10}(D_{ref})$ and then, for each possible pointing distance of the antenna $D_{pt}$ from the area of interest, calculate the antenna elevation S that makes it possible to target the distance $D_{pt}$ via the center of the antenna and then, for each distance D from the region of interest, calculate the angle $\theta$ at which the antenna observes the point of the ground at the distance D and to calculate a criterion $$K(D) = G_e(\theta) + G_r(\theta) - 40 \log_{10} D + L_{ref}(h_{ref}, D_{ref}) - L_{atmo}(h, D)$$

where $G_e(\theta)$, $G_r(\theta)$ are respectively the gains of the antenna that are normalized at emission and at reception, and then calculate all of the distances D that, for this pointing distance $D_{pt}$, satisfy the relationship $K(D) > K_{ref}$ so as to obtain the start and the end of the sub-swath actually able to be used by the radar system, and lastly repeat these calculation steps for all of the pointing distances $D_{pt}$ from the area of interest, and then calculate the actually usable sub-swaths (A, B, C) that are to be juxtaposed in order to cover the whole of the area of interest without discontinuities, with minimum overlap and with a minimum number of elevational antenna pointing operations, said processing means being adapted to command said antenna to point said actually usable sub-swaths.

7. The airborne radar system according to claim 6, wherein the radar waveforms emitted by the antenna are able to be configured.

8. The airborne radar system according to claim 6, wherein the emission and reception patterns are able to be configured.

* * * * *